United States Patent
Pegues

(10) Patent No.: US 12,042,073 B2
(45) Date of Patent: Jul. 23, 2024

(54) ABSORBENT PILLOWCASE

(71) Applicant: Sonya Pegues, Dallas, TX (US)

(72) Inventor: Sonya Pegues, Dallas, TX (US)

( * ) Notice: Subject to any disclaimer, the term of this patent is extended or adjusted under 35 U.S.C. 154(b) by 884 days.

(21) Appl. No.: 17/091,765

(22) Filed: Nov. 6, 2020

(65) Prior Publication Data
US 2021/0120984 A1 Apr. 29, 2021

Related U.S. Application Data

(60) Provisional application No. 62/899,774, filed on Sep. 13, 2019.

(51) Int. Cl.
*A47G 9/00* (2006.01)
*A47G 9/02* (2006.01)
*B32B 5/02* (2006.01)
*B32B 5/26* (2006.01)

(52) U.S. Cl.
CPC .......... *A47G 9/0253* (2013.01); *B32B 5/024* (2013.01); *B32B 5/026* (2013.01); *B32B 5/028* (2013.01); *B32B 5/26* (2013.01); *B32B 5/263* (2021.05); *B32B 5/2795* (2021.05); *B32B 2250/20* (2013.01); *B32B 2262/0261* (2013.01); *B32B 2262/0276* (2013.01); *B32B 2262/0292* (2013.01); *B32B 2307/726* (2013.01)

(58) Field of Classification Search
CPC .......... A47G 9/00; A47G 9/02; A47G 9/0253; B32B 5/028; B32B 5/263; B32B 5/2795; B32B 2250/20; B32B 2262/0261; B32B 2262/0276; B32B 2262/0292; B32B 2307/726

See application file for complete search history.

(56) References Cited

U.S. PATENT DOCUMENTS

| | | | |
|---|---|---|---|
| 2012/0186016 A1* | 7/2012 | Martin | A47C 31/11 5/490 |
| 2014/0261193 A1* | 9/2014 | Smith | A47G 9/0253 119/28.5 |
| 2015/0306839 A1* | 10/2015 | Beliveau | A41D 31/065 428/319.3 |
| 2016/0242580 A1* | 8/2016 | Batiste | B32B 5/18 |
| 2016/0309928 A1* | 10/2016 | Lukin, Jr. | A47G 9/0253 |
| 2017/0105555 A1* | 4/2017 | Lukin, Jr. | A47G 9/0253 |
| 2019/0290034 A1* | 9/2019 | Beyda | A47G 9/0253 |
| 2019/0343305 A1* | 11/2019 | Cubbler | A47G 9/0253 |

* cited by examiner

*Primary Examiner* — Fredrick C Conley
(74) *Attorney, Agent, or Firm* — Polsinelli PC

(57) ABSTRACT

A pillowcase having a first top layer of a polyester mesh wicking fabric. The pillowcase further comprises a second contiguous top layer of a polyester nylon wicking microsuede and a third contiguous top layer of a polyurethane laminate material. The first layer of the pillowcase is adjacent to the top exterior of the pillowcase. The pillowcase further comprises a bottom layer of the polyester mesh wicking fabric. The pillowcase has a bottom layer that is adjacent to the bottom exterior of the pillowcase. The pillowcase further can have a second contiguous bottom layer of the polyester nylon wicking microsuede and a third contiguous bottom layer of the polyurethane laminate material.

14 Claims, 2 Drawing Sheets

ABSORBENT PILLOWCASE

FIELD OF THE INVENTION

The present disclosure relates to pillows and pillowcases. More specifically, this invention relates to pillowcase constructions that are waterproof.

BACKGROUND

Pillowcases are a fabric structure used to enclose a pillow. An average sleeping pillowcase is formed from two pieces of fabric and has a pocket for a pillow to be inserted. A user may go to bed with their hair wet so that it can naturally dry while they are sleeping. Additionally, thick hair that is either curly or straight takes longer to dry and a user who has thick hair may prefer to sleep on their wet hair and let it dry while they sleep. This can cause the pillow to also get wet and in turn cause the user to lay their head or face on a wet pillow.

SUMMARY OF THE INVENTION

The absorbent pillowcase in accordance with aspects of the present invention provides multiple layers of fabric. The outer layer of the pillowcase is a polyester mesh wicking fabric, which is a smooth, soft and wicking fabric. This layer absorbs water and other similar liquids and dries it. The next layer, which is the second to outer layer, is made of a polyester nylon wicking microsuede. This absorbs and disperses the water that is captured by the first top layer. The third layer is a layer of laminated polyurethane laminate (PUL), which keeps the pillow itself from getting wet.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in details below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein is a multi-layer pillowcase, which facilitates the absorbing and dispersing of liquid. The pillowcase construction provided is for use in covering of a conventional bed pillow or any pillow in which people may lay their head on or go to sleep on. The pillowcase is for use in the wicking and dispersion of liquid for maintaining the sleeping pillow in a dry state. Such a sleeping pillow with a pillowcase may be positioned upon a bed in such a manner as to allow the head of the user to be placed thereon to facilitate sleeping.

Figure 1A:
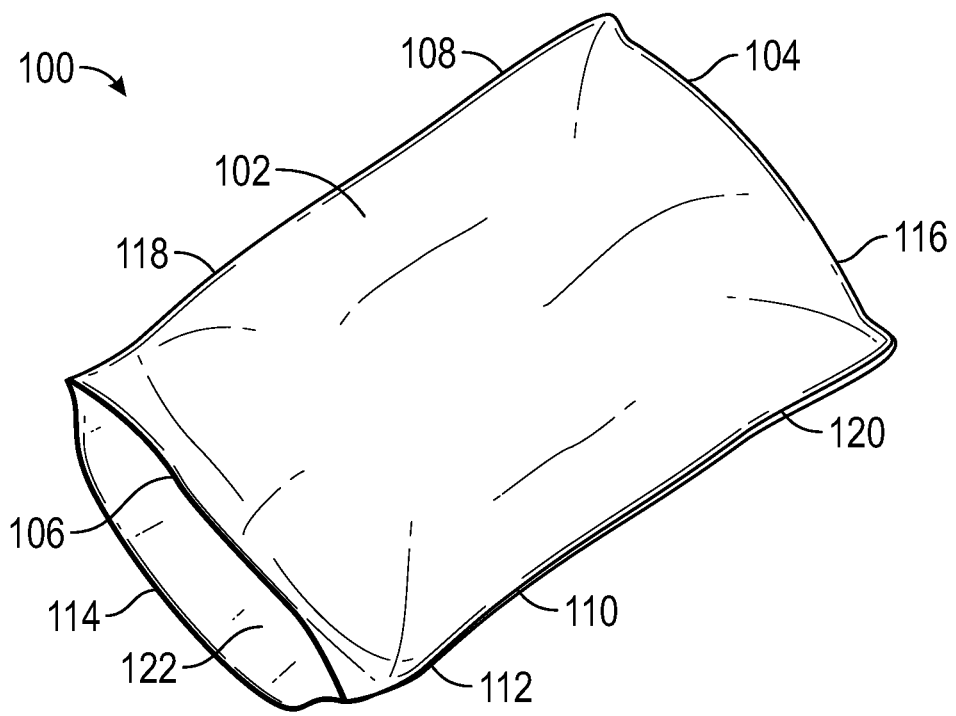
FIGS. 1A-1B are a perspective view of the pillowcase construction, according to various embodiments.
Figure 1B:
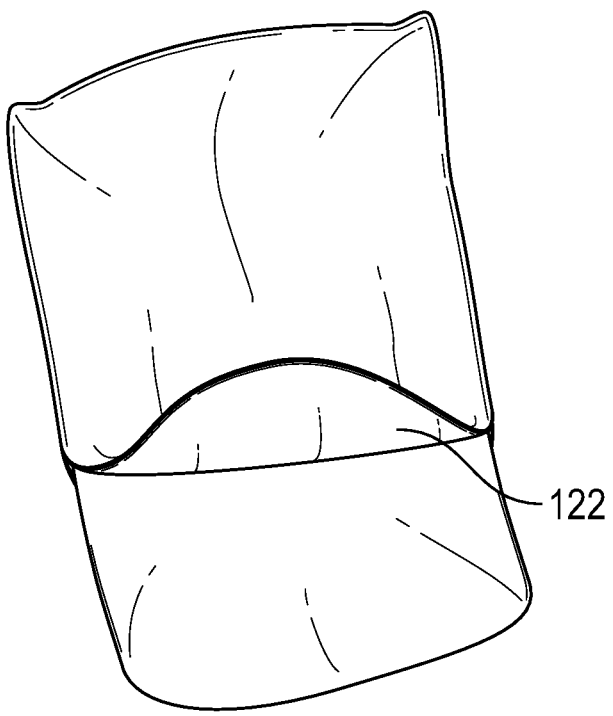

FIGS. 1A-1B are a perspective view of the pillowcase 100, according to various embodiments. As depicted in FIGS. 1A-1B, a pillowcase 100 for a sleeping pillow is configured in a generally rectangular configuration. The construction of the pillowcase 100 has an upper planar member 102 that includes a first short edge 104 and a second short edge 106. The aforementioned short edges can be parallel to each other and spatially disposed from each other on the upper planar member 102 at opposite edges. The upper planar member 102 also includes a first long edge 108 and a second long edge 110.

The pillowcase 100 has a lower planar member 112 which is of a similar shape and configuration to the upper planar member 102. The lower planar member 112 includes a first lower short edge 114 and a second lower short edge 116. The lower planar member 112 also includes a first lower long edge 118 and a second lower long edge 120 extending generally parallel to one another and spaced from one another.

The pillowcase 100 can be formed from a sheet of fabric folded to form multiple congruent rectangular fabric layers. The peripheral edges of the rectangular layers define sets of adjacent edges. The long edges of each of the layers form one set of adjacent sides and the short edges form another set of adjacent sides. Each of the layers has mutually adjacent long edges and mutually adjacent short edges. The pillowcase 100 has a top layer and a bottom layer. The top layer can have one or more contiguous layers. The bottom layer can have one or more contiguous layers. Each of the layers is permanently connected to the other layer along its long edges. The mutually adjacent sets of longitudinal sides of the two fabric layers are permanently secured to each other, for example, by sewing the edges together.

In one embodiment, the sides of the resting surface (i.e., adjacent to the user's head or face) can incorporate an opening 122. This opening 122 permits the insertion and removal of the pillow from the pillowcase 100. In another embodiment, the pillowcase can include an opening 122 traversing a side opposite the resting surface of the pillowcase 100. The opening 122 may include a collar (not shown) that overlaps the end of the pillowcase.

Figure 2:
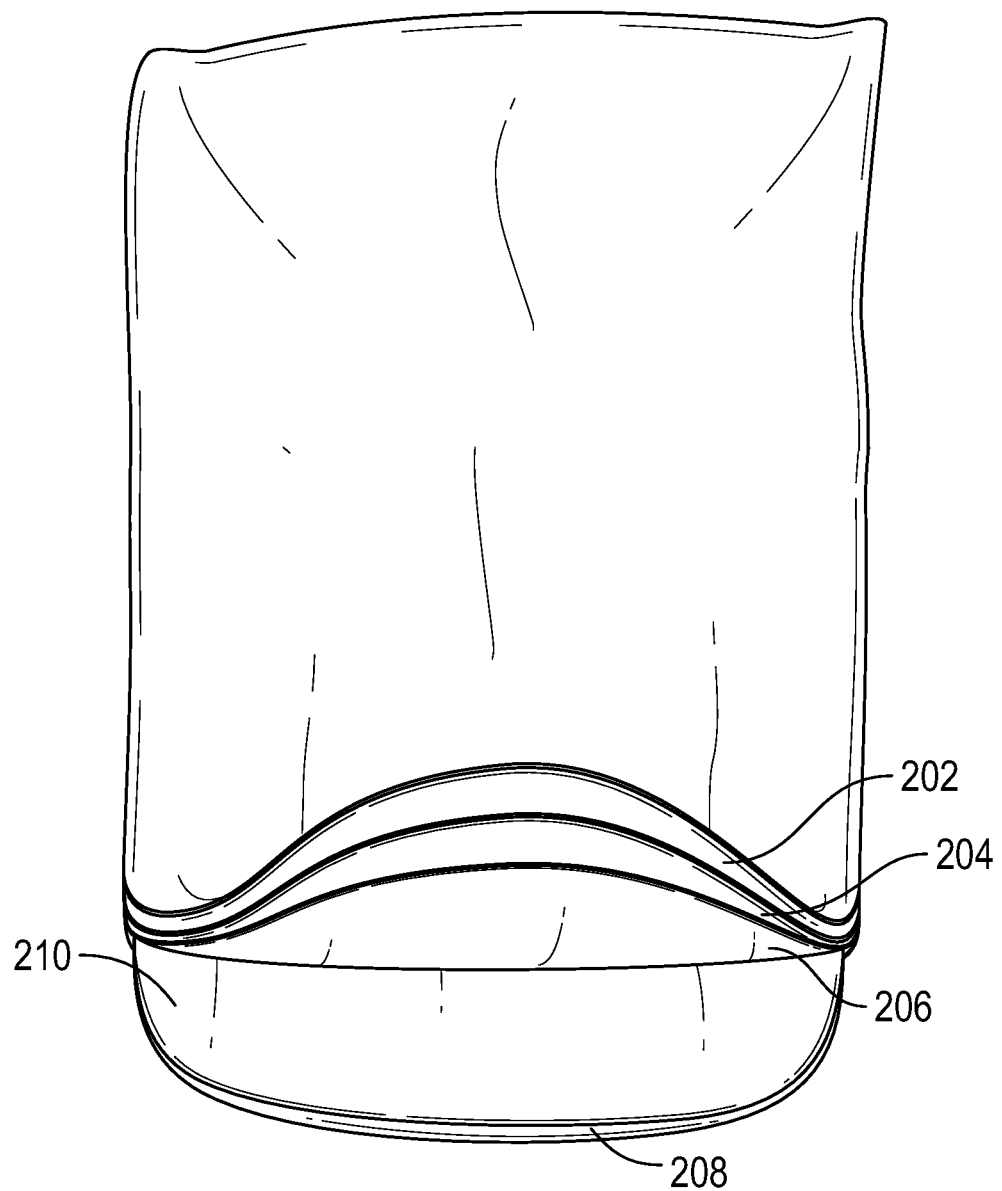
FIG. 2 is a side cross-sectional view of the pillowcase construction with a pillow therein illustrating the multiple layers, according to various embodiments.

FIG. 2 is perspective view of the layers of the pillowcase with a pillow therein, according to various embodiments. The first top layer 202 is a polyester mesh wicking fabric, which is made from 100 percent polyester materials. Polyester is water resistant, has a resistance to certain chemicals, can withstand higher temperatures because of its higher melting point, and is resistant to most types of solvents. The yarns of the fabric are woven together, resulting in a fabric with open spaces in between the strands of yarn.

The polyester mesh wicking fabric is softer than cotton, with a texture of a synthetic fiber. The polyester mesh wicking fabric is lightweight and able to wick moisture by relying on capillary action. Moisture gets absorbed into the polyester mesh wicking fabric and is held there instead of moving through the fabric. The polyester mesh wicking fabric is soft and light and it absorbs water and dries slowly making it breathable and cool to wear. The bottom layer 208 of the pillowcase (i.e., the opposite of the side that is adjacent to the user's head or face) has a single layer. The bottom layer of the pillow case can also be made of polyester mesh wicking fabric. This layer can be congruent to the pillow 210 that is inserted in the pillow case.

The second layer 204 is made of polyester nylon wicking microsuede, which is a super-absorbent hypoallergenic fabric that rapidly captures and distributes moisture with strong holding capacity. Microsuede is a type of microfiber that is a polyester fabric made up of millions of microfibers. The polyester nylon wicking microsuede is made up of 80% polyester and 20% nylon. The polyester nylon wicking microsuede can hold liquid more effectively than other materials, such as bamboo, cotton, and hemp knits. A second contiguous bottom layer of the pillow case can also be made of polyester nylon wicking microsuede. This layer can be congruent to the pillow 210 that is inserted in the pillow case.

The next layer 206 is made of polyurathene laminate (PUL) which is a man-made waterproof fabric. This layer is congruent to the pillow 210 that is inserted in the pillow case. This is a shield liner fabric, which is a moisture and allergen barrier fabric. It is sewn inside the pillowcase to create a shield against moisture. PUL is completely waterproof and breathable. PUL has a micro-porous coating and the tiny pores prevent larger water droplets from coming in. One side of PUL is a polyester knit and the other side is the laminate, which is smooth and shiny. Either side of the PUL can face the pillow since the waterproof properties will remain the same. The polyester knit sides can sandwich the layer of laminate. PUL washes well and dries instantly. A third contiguous bottom layer of the pillow case can also be made of PUL. This layer can be congruent to the pillow 210 that is inserted in the pillow case.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A pillowcase comprising:
a first top layer of a polyester mesh wicking fabric;
a second contiguous top layer of a polyester nylon wicking microsuede;
a third contiguous top layer of a polyurethane laminate material; and
a bottom layer of the polyester mesh wicking fabric,
wherein the first top layer, the second contiguous top layer, and the third contiguous top layer are connected along two long edges,
wherein the bottom layer and the third contiguous layer are connected along two long edges and a short edge.

2. The pillowcase of claim 1, wherein the first layer is adjacent to the top exterior of the pillowcase.

3. The pillowcase of claim 1, wherein the first layer is adjacent to a user's head or face.

4. The pillowcase of claim 1, wherein the third contiguous layer and the bottom layer form an opening that is adapted to receive a pillow.

5. The pillowcase of claim 4, wherein the opening includes a collar that overlaps an edge of the pillowcase.

6. The pillowcase of claim 1, wherein the bottom layer is adjacent to the bottom exterior of the pillowcase.

7. The pillowcase of claim 1, further comprising a second contiguous bottom layer of the polyester nylon wicking microsuede.

8. The pillowcase of claim 1, further comprising a third contiguous bottom layer of the polyurethane laminate material.

9. A pillowcase with a pillow comprising:
a pillow;
a first top layer of a polyester mesh wicking fabric;
a second contiguous top layer of a polyester nylon wicking microsuede;
a third contiguous top layer of a polyurethane laminate material; and
a bottom layer of the polyester mesh wicking fabric,
wherein the first top layer, the second contiguous top layer, the third contiguous top layer, and the bottom layer are connected together along two long edges and the third contiguous top layer and the bottom layer are unconnected along a common edge, the common edge adapted to receive said pillow.

10. The pillowcase of claim 9, further comprising a second contiguous bottom layer of the polyester nylon wicking microsuede.

11. The pillowcase of claim 9, further comprising a third contiguous bottom layer of the polyurethane laminate material.

12. The pillowcase of claim 9, wherein the first layer is adjacent to a user's head or face.

13. The pillowcase of claim 9, wherein the common edge includes a collar that overlaps an edge of the pillowcase.

14. The pillowcase of claim 9, wherein the first top layer, the second contiguous top layer, the third contiguous top layer, and the bottom layer are connected to form at least one short edge.

* * * * *